W. L. PATTERSON.
PROJECTION APPARATUS AND ILLUMINATION SYSTEM THEREFOR.
APPLICATION FILED FEB. 7, 1916.

1,224,663.

Patented May 1, 1917.

WITNESS
George A. Page

INVENTOR
William L. Patterson
BY
ATTORNEYS

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS AND ILLUMINATION SYSTEM THEREFOR.

1,224,663.     Specification of Letters Patent.     Patented May 1, 1917.

Application filed February 7, 1916.   Serial No. 76,530.

*To all whom it may concern:*

Be it known that I, WILLIAM L. PATTERSON, a citizen of the United States, residing at Rochester, in the county of Monroe, State of New York, have invented certain new and useful Improvements in Projection Apparatus and Illumination Systems Therefor; and I do declare the following to be a full, clear, and exact description of the same, reference being had to the accompanying drawings, forming a part of this specification, and to the figures and letters of reference marked thereon.

My invention relates to that class of optical instruments known as projection apparatus and relates more particularly to projection apparatus adapted to project objects by reflection of light therefrom and also to apparatus for projecting objects by both reflection of light therefrom and by transmission of light therethrough. Further, my invention relates to means for illuminating an object or objects to be projected.

Heretofore in projection apparatus, the proper and efficient illumination of objects to be projected by reflected light has been made very difficult by the excessive heat radiated by various available light sources suitable for illuminating such objects. Thus the light source has had to be placed at a safe distance from the object, rather than at a distance compatible with ideal illumination, and thus reflecting elements for directing light from remote portions of the light source upon the object, have had to be designed and placed with regard to the heat they have had to stand, rather than with regard to optical efficiency. The result has been that much more energy has had to be consumed in order to illuminate an object of this nature than was really warrantable and also the heat to which the object was subjected during the process of projection has been so intense that the object could not be projected for a very long period without danger of ruin, either by scorching or by burning. One object of the present invention is to overcome these difficulties. Another object of the present invention is to uniformly and efficiently illuminate such an object by means of a single light source. Another object of the invention resides in providing an improved illuminating system for projection apparatus. Another object resides in providing a projection apparatus so organized as to be readily and conveniently capable of projecting objects by reflected or by transmitted light, either simultaneously or selectively. Still another object resides in providing a simple and efficient projection apparatus for projecting at will, either of two objects, one by reflected light and the other by transmitted light, the change from one to the other being effected by the simple operation of moving a suitably devised shade or screen. Other objects will hereinafter become apparent.

To these and other ends, my invention resides in the novel combination of elements, in the arrangement of parts and in the novel features all hereinafter set forth and more particularly pointed out in the appended claims.

Figure 1:
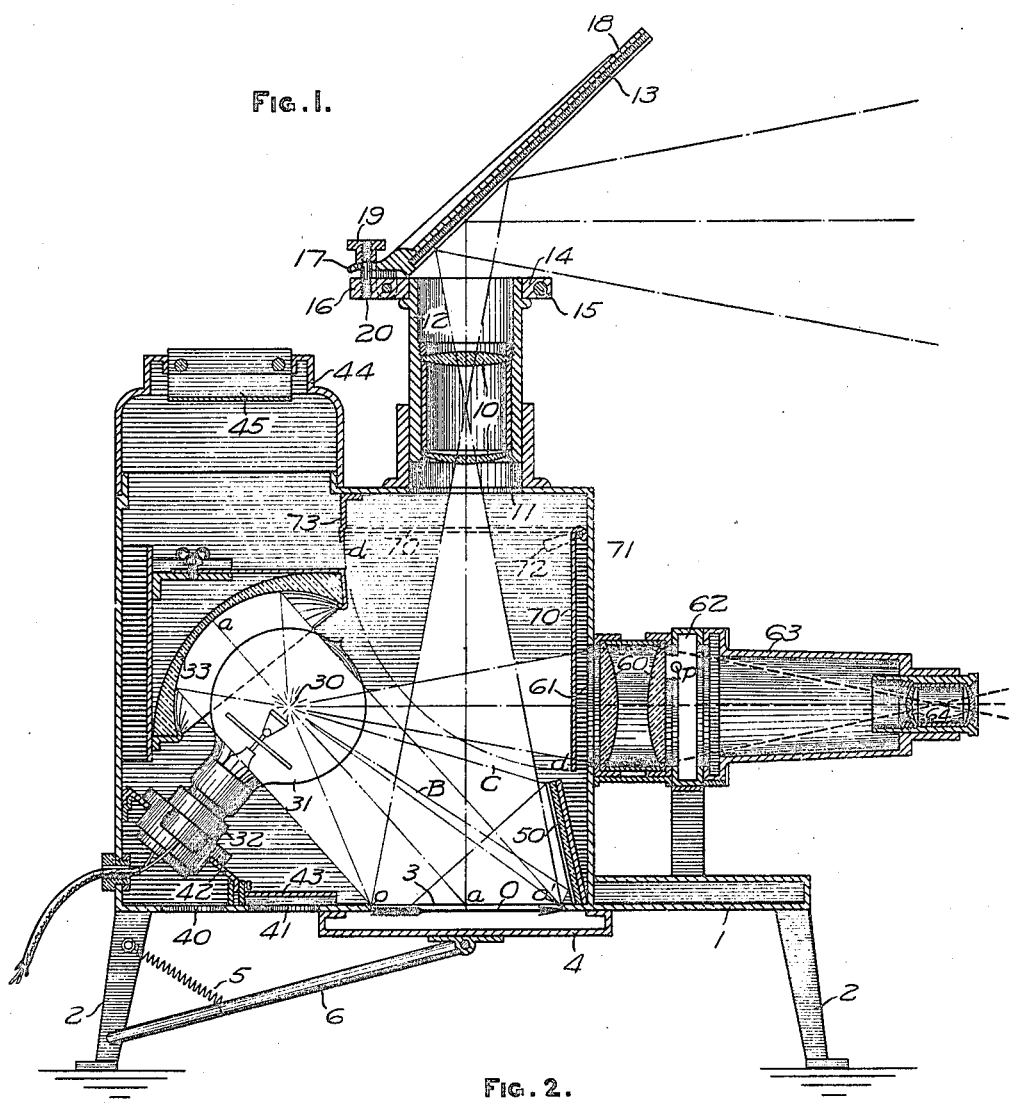
Figure 1 is a vertical longitudinal section of an apparatus constituting an embodiment of my invention.

In the preferred embodiment of my invention I prefer to construct my instrument in the form of a light tight box or lamphouse, mounted on a base 1 provided with legs 2. In the bottom wall of the lamphouse and adjacent the front wall, I provide an aperture 3, within which aperture should be placed the object which it is desired to project by light reflected therefrom. As a convenient means of supporting such an object in position, I provide the object holder 4 which is yieldingly held in place against the bottom of the lamphouse by means of a pair of springs as 5 operating on a pair of arms as 6, which are hinged at their lower end to the rear leg of the apparatus, and upon the upper end of the arms is hinged the object holder proper. It will be understood that any flat object which it is desired to project by reflected light, should be held with its surface coincident with the surface of the aperture 3. Any solid object is simply laid upon the object holder.

That kind of projection wherein the image of the object is projected by means of light reflected from a surface of the object, is in the art, ordinarily termed "opaque projection" and an object adapted to this sort of projection is known as an "opaque object." These terms may hereinafter be used for the sake of clearness and brevity.

In suitable coöperative relation with the opaque object aperture is arranged the objective system 10, adapted to opaque projection, which objective system may aptly be termed "opaque projection objective." This objective in the present embodiment of my invention is placed in registry with the aperture 11 in the top wall of the lamphouse, directly opposite the object aperture. By this arrangement, the principal central axis of the opaque projection objective is adapted to be concentric with the axis of the object, and in the case of a plane object, normal to the surface thereof. The opaque objective system is carried in a mount 12 which is adjustable relatively to the object for the purpose of focusing, suitable means being provided for conveniently focusing the objective. The plano reflector 13 is mounted beyond the objective 10 and operates to deflect the light emerging from the said object forwardly as shown. For convenience of adjustment, I preferably mount a split collar 14 upon the outermost end of the objective mount 10, which collar is angularly adjustable about the objective mount when clamping screw is loosened, and is locked rigidly in position when clamping screw is tightened. This collar is provided at one side with the extension or lug 16 upon which the mirror 13 is hinged. Adjustment for the inclination of the surface of said mirror with relation to the axis of the objective 10 and the maintenance of any desired adjustment is provided by means of the ear 17 formed on the reflector carrier 18 with which ear coöperates the threaded nut 19 and the stud 20, which latter is threaded into the extension or lug 16 of the collar.

The illumination of the opaque object to be projected is effected by an illuminating system wherein a single incandescent electric lamp, embodying a very compact, concentrated, incandescent light source inclosed within a transparent spherical bulb of exceedingly small diameter relatively to the spherical candle power of the light source, is used. The form of lamp is concentrated as much as possible and the construction and characteristics of the lamp are such as to permit the light source to be safely located in close proximity to that surface of the object to be projected and to enable the effective use of a concave reflector of high optical efficiency behind the light source and in close proximity thereto. The location of the light source and its coöperating concave reflector with relation to that surface of the object which is to be illuminated, is such that direct divergent light, is incident upon the surface of the object from the proximate side of the light source after having traveled only a comparatively short distance, and parallel or divergent reflected light, is incident on the object from the remote side of the light source through the agency of the concave reflector, the character of the reflected light depending on the type of reflector used and its location with relation to the light source.

Further, the light source and its coöperating reflector is arranged between the opaque object and its objective, in a position slightly to one side of the path of light between the object and objective, whereby the general direction of the light incident upon the object from the light source and concave reflector, will be inclined to the surface of the object, while the extension or continuation of the opaque objective's axis, is substantially normal to that surface of the opaque object just referred to.

In carrying out this feature, I employ a single incandescent lamp comprising in the main, an extremely concentrated filament, conventionally represented at 30 in Fig. 1 and which preferably comprises a group of flexible tungsten coils as 30ª arranged as shown in a circular row to generate a body of substantially spherical form, this body of coils being centrally arranged within a transparent hard glass spherical bulb of approximately from seven to eight times the diameter of the filament, and the whole is conveniently carried by a socket plug portion.

This lamp is mounted in position by screwing the socket plug portion thereof into the socket of the lamp base 32 which is adjustably mounted upon an inclined partition 42 within the lamphouse. The location of this lamp within the lamphouse is determined by the following conditions: While it is advisable to get the light source as close to that surface of the opaque object which is to be illuminated as is possible, the light source itself must not come within the field covered by the opaque projection objective, that is, it must be far enough at one side of the objective axis, to preclude the possibility of direct light rays from the light source finding their way through the said objective to the reflector 13. Also it must be so located that none of the rays incident upon the surface of the object, will be directly reflected through the objective, but instead the objective referred to will receive only that light projected by diffusive reflection from the object O which for the present purposes we will presume is a plane object.

Having thus approximately located the light source, a concave reflector, which in this case is a mangin mirror 33, is adjustably mounted behind the said lamphouse with its axis coincident with a straight line passing from the center of the object through the light source, thus we may call the line *a—a* at the same time the axis of the mangin mirror. Next, the light and mirror either or both, are so adjusted relatively to each other, that the focus of the mangin mirror and the light source proper are coincident. When this condition has been established, all of the light incident upon the mangin mirror from that side of the light source most remote from the object will be directed upon the object as a beam of parallel light, coming from a direction inclined similarly to the inclination of the principal central ray of direct divergent light incident from the light source upon the object.

In the lower wall of the lamphouse, suitable apertures 40 and 41, properly screened in this case by partitions 42 and 43 to prevent the escape of light, are provided to admit ventilating air, while in the upper portion of the lamphouse is provided a ventilator 44 provided with a light tight grating 45, through which the hot air may readily escape. Suitable ventilation of the lamphouse is thus provided, which prevents the interior of the lamphouse from becoming unduly hot.

It is obvious from the drawings that a portion *o* of the object O is closer to the light source than the portion *o'*, the distance from the light source increasing gradually from *o* to *o'*. Therefor, since the object O is illuminated wholly or in part by divergent light from the comparatively small light source 30, it is evident that according to the inverse square law, namely: that illumination at a given distance from a small source of light is inversely proportional to the square of the distance; the illumination of object O will gradually fall off from *o* to *o'* to a considerable extent. To overcome this objection, I provide a compensating reflector which is mounted on the remote side of the object, in such a manner as to gather a quantity of light direct from the light source and to reflect this light upon the insufficiently illuminated portion of the object in such a manner as to equalize the illumination.

In carrying out this feature of my invention, I employ a glass mirror 50, silvered on its second surface and arranged as shown, adjacent the front wall of the lamphouse on the opposite side of the object holder to that on which the light source is located, this mirror being so inclined with relation to the light source and the object that light incident upon the reflecting surface of the mirror 50 will be directed upon the imperfectly illuminated portion of the object. But this is not all, for it is not desirable that the beam of light directed upon the object by the compensating mirror be uniform, else the compensating mirror would function only to increase the illumination of the object without equalizing this illumination and in some cases, might in fact make the illumination still more uneven. By arranging the parts as shown, however, the pencil of light B incident near the base of the mirror 50 is reflected on the remote portion of the object after traveling a shorter distance than the pencil C incident on the upper portion of the compensating mirror, and reflected on the nearer portion of the object as shown. Thus the divergent light included between pencils B and C is in effect reversed and virtually originates at point P (in the drawing, Fig. 1 shown in the vicinity of the slide carrier support 62 which is broken away at this point) falling on the object from a direction opposite to that from which the direct divergent light falls on said object. The result is, that the beam of light from the compensating mirror augments the illumination of the object to a greater extent in the vicinity of *o'* than it does in the vicinity of *o*.

Figure 2:
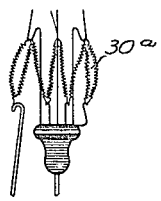
Fig. 2 is a detail view of the preferred form of filament adapted to constitute the light source.

With this system of illumination, very satisfactory illumination of objects up to six inches square that are to be projected by opaque projection may be obtained with the lamp described when made with a filament comprising twelve tungsten coils $30^a$ (see Fig. 2) of thirteen thirty-seconds of an inch effective length and arranged in a circular row nine sixteenth of an inch in diameter when inclosed within a nitrogen or argon gas filled bulb of hard glass of a diameter of five inches, the current consumption of the lamp necessary in this system, being about 1,000 watts. This form of lamp has an efficiency of some sixty-five one-hundredth of a watt per candle power and therefor this lamp can develop over 1,500 candle power on either direct or alternating current.

Compared with the arc lamp which it has heretofore been necessary to use to obtain satisfactory illumination of a similar object, the expense of illuminating the object by my improved illumination system is only one half or one third (according to whether A. C. or D. C. arc has been used) of the cost of the current and carbon consumption of the arc. Other advantages inherent in this system are the convenience of manipulation and the relatively low heating effect therefrom when the lamphouse is properly ventilated.

Stress is here laid on the desirability of the specific arrangement of parts shown, on the form, features and proportions of each unit in itself and of the units with relation to one another. The advantages of the compact bulb in which the filament is inclosed and the advantages accruing from this bulb being spherical in form are evident when the manner in which this incandescent lamp is used and the elements with which it is combined are taken into consideration.

The apparatus thus far described constitutes a projection apparatus for projecting objects by opaque projection only. However, not only are the features thus far described readily adapted to be embodied in an apparatus for projecting both opaque and transparent objects, but the apparatus thus far described in itself may, by a proper application of a projecting system for transparent objects, be built as a combined apparatus, also, as it will appear to any one skilled in the art, it will be quite feasible to apply the transparent projecting system in such a manner that it could readily be attached or removed as desired. In the event of using two systems it will usually be found preferable to provide some means whereby the passage of light through either the system for opaque projection or the system for transparent projection may readily be controlled, although if desired it is perfectly feasible to project two images simultaneously upon the screen, the images being directed so as to fall adjacent one another instead of coincident as is usual when it is desired to substitute one for the other.

To this end is preferably arranged in the front wall of the lamphouse and with its axis intersecting the light source 30, a system for projecting transparent objects such as lantern slides, etc., which comprises condensing lenses 60 mounted adjacent the aperture 61 in the front wall of the lamphouse as shown. The transparent object holder, or more specifically the slide carrier support 62 is mounted in line with the condensing system and adjacent front member thereof as shown. In front of the slide support 62 is detachably mounted, in axial alinement with the condensing lenses, the tubular extension 63 and in the forward end of this tubular extension is mounted, so as to be longitudinally adjustable for the purpose of focusing, the objective system 64 for transparent projection.

For the purpose of effecting one form of projection to the exclusion of the other at will, I preferably employ a shutter or shield 70 which is mounted upon a shaft 71 and which shield is rotatable about the axis of the said shaft from a vertical position (in which it is shown in full lines in the drawing) to a horizontal position (in which the shield is shown in dotted lines in the drawing) by means of a handle 72 conveniently located on the outer side of the lamphouse. When in a vertical position, (which position the shield is adapted to hold without the aid of a lock or catch) the shield functions to cut off light from the transparent projecting system while permitting light to pass through the opaque projection system and therefore opaque projection only will be effected. When moved from a vertical position to a horizontal position the shield 70, the free end of which follows the path indicated in dot and dash lines at d—d gradually cuts off light from the opaque object to the opaque projection objective and at the same time gradually withdraws from its place in the path of light between the light source and the condensers of the transparent projecting system, after which said shield engages with the yielding catch 73 which holds said shield in position to cut off light from the opaque object to the opaque projection objective whereby transparent projection will be effected and the opaque projection will be cut off with a "dissolving" effect.

While it is usually preferable to place the transparent projecting system with its axis co-incident with the light source as shown in the drawings, this is not essential in carrying out my invention, for the transparent projection system may be placed at one side of the light source and the light source directed thereon by means of a reflector interposed between said light source and the condensing lenses and any suitable means used to cut off one form of projection while permitting the other form of projection to be effected, also it is obvious that the transparent projection system need not be parallel to the direction in which it is desired to project the image from the apparatus to the screen. Neither is it essential that the specific arrangement of the opaque projection objective and its coöperating deflecting reflector that as is shown be adhered to for it is obvious that, for example, the reflector might be mounted within the lamphouse and the objective arranged beyond the reflector in a position with its axis parallel to the transparent objective if desired.

Having thus described my invention, what I claim and desire to secure by Letters Patent of the United States, is:

1. In a projection apparatus, the combination with a holder for an object to be projected by reflection and an objective arranged in coöperative relation thereto, of an illuminating system comprising a single light source located at one side of the object and in close proximity to that surface of said object which is to be projected and in a direction inclined thereto, a light converging reflector arranged with its axis co-incident with a straight line extending from said light source to said object and a compensating reflector mounted on that side of the object opposite to the light and arranged to direct the light rays received from the light source onto the object from a direction at the side of the object remote from the light.

2. In a projection apparatus, the combination with a holder for an object to be projected by reflection, a holder for an object to be projected by transmitted light, an objective individual to the former and an objective and condensing lenses individual to the latter, of an illuminating system comprising a concentrated light source arranged in close proximity to the surface of the holder for the object to be projected by reflection, and in position to supply illumination to said condensing lenses, a mangin mirror mounted with its focus concentric with the light source and its axis co-incident with an axis extending from the first named object holder to the light source, of a supplementary reflector for directing light received from the light source onto said object holder from a direction opposite to that from which the light is directly incident thereon and means for interrupting the passage of light through one system while permitting the passage of light through the other system.

3. In a projection apparatus, the combination with a holder for the object to be projected by reflection, a holder for the object to be projected by transmitted light, and a lens system individual to each of the object holders, of a light source arranged in position to simultaneously direct light upon the first named object holder and to direct light through the last named object holder, and a swinging shutter adapted to selectively swing either in position to intercept the path of light from the first named object holder to its coöperating objective, or to swing into position to intercept the path of light from the light source through the last named object holder, said shutter functioning to open one light path while obstructing the other.

WILLIAM L. PATTERSON.

Witnesses:
WILLIAM G. WOODWORTH,
GEORGE A. PAGE.